(12) United States Patent
Inoue (10) Patent No.: US 11,430,991 B2
(45) Date of Patent: Aug. 30, 2022

(54) LITHIUM-NICKEL COMPOSITE OXIDE AND METHOD OF PRODUCING LITHIUM-NICKEL COMPOSITE OXIDE (71) Applicant: SUMITOMO METAL MINING CO., LTD., Tokyo (JP)

(72) Inventor: Yoshihiro Inoue, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 27 days.

(21) Appl. No.: 17/041,151

(22) PCT Filed: Mar. 27, 2019

(86) PCT No.: PCT/JP2019/013433
§ 371 (c)(1),
(2) Date: Sep. 24, 2020

(87) PCT Pub. No.: WO2019/189504
PCT Pub. Date: Oct. 3, 2019

(65) Prior Publication Data
US 2021/0013510 A1 Jan. 14, 2021

(30) Foreign Application Priority Data

Mar. 28, 2018 (JP) .............................. JP2018-063187

(51) Int. Cl.
H01M 4/525 (2010.01)
H01M 10/0525 (2010.01)
C01G 53/04 (2006.01)

(52) U.S. Cl.
CPC ............ *H01M 4/525* (2013.01); *C01G 53/04* (2013.01); *H01M 10/0525* (2013.01)

(58) Field of Classification Search
None
See application file for complete search history.

(56) References Cited

U.S. PATENT DOCUMENTS

2013/0156683 A1 6/2013 Holzapfel et al.
2014/0353547 A1 12/2014 Mitsumoto et al.
2016/0013472 A1 1/2016 Mitsumoto et al.

FOREIGN PATENT DOCUMENTS

| CN | 204018001 U | 12/2014 |
| CN | 104835944 | 8/2015 |
| CN | 105244493 | 1/2016 |
| EP | 2128096 | 12/2009 |
| EP | 2416409 | 2/2012 |
| EP | 3467909 | 4/2019 |
| JP | 2003-183029 | 7/2003 |
| JP | 2009164062 A * | 7/2009 |
| JP | 2010-033786 | 2/2010 |
| JP | 2013-534203 | 9/2013 |
| WO | 2013/100070 | 7/2013 |
| WO | 2014/136760 | 9/2014 |
| WO | 2017/213112 | 12/2017 |

OTHER PUBLICATIONS

Translation of CN 204018001 Dec. 17, 2014 (Year: 2014).*
International Search Report dated Jun. 18, 2019 with respect to PCT/JP2019/013433.

* cited by examiner

*Primary Examiner* — Tanisha Diggs
(74) *Attorney, Agent, or Firm* — IPUSA, PLLC (57) ABSTRACT The present invention relates to a lithium-nickel composite oxide, wherein the lithium-nickel composite oxide is represented by a following general formula: $Li_{1+u}Ni_xCo_yA_sB_tO_{2+\alpha}$, wherein u, x, y, s, t and α in the formula satisfy $0 \le u < 0.3$, $0.03 \le x \le 0.93$, $0.03 \le y \le 0.50$, $0.04 \le s \le 0.6$, $0 \le t < 0.1$, $0 \le \alpha < 0.3$ and $x+y+s+t=1$, wherein an element A is at least one selected from Mn and Al, and an element B is at least one selected from Mg, Ca, Ti, V, Zr, Nb, Mo, Sr and W, and wherein a content of Fe is less than 10 ppb, and a content of Cr is less than 10 ppb.

3 Claims, 3 Drawing Sheets

LITHIUM-NICKEL COMPOSITE OXIDE AND METHOD OF PRODUCING LITHIUM-NICKEL COMPOSITE OXIDE

FIELD OF THE INVENTION

The present invention relates to a lithium-nickel composite oxide and a method of producing a lithium-nickel composite oxide.

BACKGROUND OF THE INVENTION

In recent years, with the spread of portable electronic devices, such as mobile phones and notebook type personal computers, development of small and lightweight secondary batteries having high energy density has been required. Further, as a battery for electric vehicles such as hybrid vehicles, development of a high output secondary battery is required. Conventionally, lithium ion secondary batteries are considered as suitable non-aqueous electrolyte secondary batteries that satisfy such requirements.

A lithium-ion secondary battery is composed of a negative electrode, a positive electrode, an electrolytic solution, or the like. A material capable of de-intercalating and intercalating lithium is used as an active material of the negative electrode and the positive electrode.

A lithium ion secondary battery using a lithium composite oxide, particularly a lithium-cobalt composite oxide, which is relatively easy to synthesize, as a positive electrode material is expected to have a high energy density because a high voltage such as 4-Volt class can be obtained. Therefore, practical application of a lithium ion secondary battery has been progressing. Many developments have been made so far in order to obtain excellent characteristics of initial capacity and cycle characteristics for batteries using lithium-cobalt composite oxides, and various results have already been obtained.

However, because the lithium-cobalt composite oxide uses cobalt, which is an expensive raw material, the unit price per capacity of a battery using lithium-cobalt composite oxide is significantly higher than that of the nickel hydride battery, and the applicable applications are considerably limited.

Therefore, for small secondary batteries for mobile devices and large secondary batteries for power storage, electric vehicles or the like, it has been greatly desired to reduce the cost of the positive electrode material and to produce a cheaper lithium-ion secondary battery. Accordingly, the realization of such production is industrially significant.

As an alternative material for the positive electrode active material for a lithium ion secondary battery, a lithium-nickel composite oxide using nickel, which is cheaper than cobalt, can be mentioned. This lithium-nickel composite oxide shows a lower electrochemical potential than the lithium-cobalt composite oxide. Accordingly, the decomposition of the electrolytic solution due to oxidation is unlikely to be a problem, and a higher capacity can be expected. Further, a high battery voltage, similar to a cobalt-based compound such as a lithium-cobalt composite oxide, is exhibited. Therefore, the development of lithium-nickel composite oxide has been actively carried out.

However, when a lithium-ion secondary battery is produced by using a lithium-nickel composite oxide synthesized purely with nickel as a positive electrode material, the cycle characteristic is inferior to that of cobalt type, and it has the drawback that battery performance is relatively easily impaired when used or stored in a high temperature environment. Because of this, a lithium-nickel composite oxide may be configured such that a portion of the nickel is replaced with cobalt or aluminum, as is generally known in the art.

For example, Patent Document 1 discloses a lithium-nickel composite oxide represented by:

$Li_xNi_yQ_{(1-y)}O_2$, where x and y represent numbers $0<X\leq1.2$ and $0.5\leq Y\leq1$, respectively. Q represents at least one metal selected from the group consisting of Co, Al, Mg, Ga, Ti and Ca.

RELATED-ART DOCUMENT

Patent Documents

Patent document 1: Japanese Unexamined Patent Publication No. 2003-183029

SUMMARY OF THE INVENTION

Problems to be Solved by the Invention

In lithium ion secondary batteries, further improvement in performance has been recently demanded, and for example, improved thermal stability has been demanded.

The inventor of the present invention has found that Fe and Cr content, as magnetic metals contained in a lithium-nickel composite oxide, can greatly affect the thermal stability of a lithium ion secondary battery in the case of using the lithium ion secondary battery with a lithium-nickel composite oxide as a positive electrode material.

In view of the problems of the above-mentioned conventional techniques, one aspect of the present invention is to provide a lithium-nickel composite oxide in which Fe and Cr content as magnetic metals reduced.

Means for Solving the Problems

To solve the above problems, one aspect of the present invention is to provide a lithium-nickel composite oxide represented by a following general formula:

$Li_{1+u}Ni_xCo_yA_sB_tO_{2+\alpha}$, wherein u, x, y, s, t and a in the formula satisfy $0\leq u<0.3$, $0.03\leq x\leq0.93$, $0.03\leq y\leq0.50$, $0.04\leq s\leq0.6$, $0\leq t<0.1$, $0\leq\alpha<0.3$, $x+y+s+t=1$, wherein an element A is at least one selected from Mn and Al, and an element B is at least one selected from Mg, Ca, Ti, V, Zr, Nb, Mo, Sr and W, and wherein a Fe content is less than 10 ppb, and a Cr content is less than 10 ppb.

Effects of the Invention

According to one aspect of the present invention, the present invention is capable of providing a lithium-nickel composite oxide in which Fe and Cr content as magnetic metals are reduced.

DETAILED DESCRIPTION

Hereinafter, embodiments for carrying out the present invention will be described with reference to the drawings. However, the present invention is not limited to the following embodiments, and the following embodiments can be variously modified and replaced without departing from the scope of the present invention.

[Lithium-Nickel Composite Oxide]

First, a configuration example of the lithium-nickel composite oxide of the present embodiment will be described.

The lithium-nickel composite oxide of the present embodiment can be represented by the general formula:

$$Li_{1+u}Ni_xCo_yA_sB_tO_{2+\alpha}.$$

Note that, u, x, y, s, t and a in the formula satisfy $0 \leq u < 0.3$, $0.03 \leq x \leq 0.93$, $0.03 \leq y \leq 0.50$, $0.04 \leq s \leq 0.6$, $0 \leq t < 0.1$, $0 \leq \alpha < 0.3$, $x+y+s+t=1$. In addition, the element A is at least one selected from Mn (manganese) and Al (aluminum), and the element B is at least one selected from Mg (magnesium), Ca (calcium), Ti (titanium), V (vanadium), Zr (zirconium), Nb (niobium), Mo (molybdenum), Sr (strontium) and W (tungsten).

Further, the lithium-nickel composite oxide in the present embodiment has a Fe (iron) content of less than 10 ppb and a Cr (chromium) content of less than 10 ppb.

As described above, further improvement in performance in lithium-ion secondary batteries has been demanded in recent years, and for example, improved thermal stability has been demanded.

The inventor of the present invention has found that the Fe and Cr content, as magnetic metals contained in a lithium-nickel composite oxide, greatly affects the thermal stability of a lithium ion secondary battery with a lithium-nickel composite oxide as a positive electrode material. The term "magnetic metals" refer to a substance that is magnetized, and does not refer hydroxides or oxides of such metals. The term refers to, for example, metallic Fe or Cr.

Then, as a result of further study, the inventor found that the thermal stability of a lithium ion secondary battery with a lithium-nickel composite oxide as a positive electrode material can enhance the thermal stability by using the lithium-nickel composite oxide having a Fe content of less than 10 ppb and a Cr content of less than 10 ppb. Therefore, the lithium-nickel composite oxide of the present embodiment preferably has a Fe content of less than 10 ppb and a Cr content of less than 10 ppb. In particular, the Fe content is preferably 5 ppb or less, and the Cr content is preferably 5 ppb or less. Because Fe and Cr are both impurities and are preferably not contained in lithium-nickel composite oxide, therefore, Fe and Cr content may be 0 or more. In addition, Fe and Cr as used herein refer to Fe and Cr as magnetic metals as described above. Therefore, in the lithium-nickel composite oxide of the present embodiment, metallic Fe and Cr attracted to magnets can be adjusted within the above range.

The Fe and Cr content in the lithium-nickel composite oxide are, for example, evaluated by Inductively Coupled Plasma-Atomic Emission Spectrometry (ICP-AES, or ICP emission spectroscopy) by contacting the lithium-nickel composite oxide to magnets, followed by analyzing a solution in which the powder adhering to the magnets dissolved with an acid.

The lithium-nickel composite oxide of the present embodiment may be represented by the general formula described above, and the element B in the general formula described above may be omitted in the lithium-nickel composite oxide because the element B is an optional additive component.

According to the lithium-nickel composite oxide of the present embodiment, the Fe and Cr content are reduced to be extremely low as described above. Therefore, the thermal stability of the lithium ion secondary battery can be improved when the lithium-nickel composite oxide is used as a positive electrode active material in a lithium ion secondary battery.

[Method of Producing Lithium-Nickel Composite Oxide]

Next, one configuration example of the method of producing the lithium-nickel composite oxide of the present embodiment will be described below. The lithium-nickel composite oxide described above can be produced by the method of producing a lithium-nickel composite oxide according to the present embodiment. Therefore, overlapping description will not be provided.

The method of producing a lithium-nickel composite oxide according to the present embodiment includes a magnetic attraction step of passing a slurry containing a lithium-nickel composite oxide represented by the general formula: $Li_{1+u}Ni_xCo_yA_sB_tO_{2+\alpha}$ through a pipe with one or more magnet units having a plurality of rod-shaped magnets, thereby causing Fe and Cr to be attracted on the plurality of rod-shaped magnets.

Note that u, x, y, s, t and a in the above formula satisfy $0 \leq u < 0.3$, $0.03 \leq x \leq 0.93$, $0.03 \leq y \leq 0.50$, $0.04 \leq s \leq 0.6$, $0 \leq t < 0.1$, $0 \leq \alpha < 0.3$, $x+y+s+t=1$. Further, the element A is one or more selected from Mn and Al, and the element B is one or more selected from Mg, Ca, Ti, V, Zr, Nb, Mo, Sr and W.

The plurality of rod-shaped magnets is placed such that longitudinal directions thereof are perpendicular to a flow direction of the slurry containing a lithium-nickel composite oxide, and are parallel to each other. The plurality of rod-shaped magnets can have a surface area per unit volume of 0.1 cm$^{-1}$ or more and 0.3 cm$^{-1}$ or less in a portion that contacts the slurry containing a lithium-nickel composite oxide.

According to the study of the inventor of the present invention, in order to improve the thermal stability in a lithium ion secondary battery using a lithium-nickel composite oxide as a positive electrode material, the content of each of Fe and Cr present in the lithium-nickel composite oxide is preferably less than 10 ppb.

As disclosed in Patent Document 1, it has been conventionally studied to reduce magnetic powder such as iron powder in a positive electrode material of a lithium ion secondary battery in order to prevent occurrence of micro short or the like. Patent Document 1 discloses a method for purifying a lithium transition metal complex oxide which remove a magnetic powder mixed in the lithium transition metal complex oxide wherein the lithium transition metal complex oxide is passed through a magnetic field having a magnetic flux density that attracts magnetic powder but does not attract the lithium transition metal complex oxide. However, the method of purifying a lithium transition metal composite oxide that performs magnetic attraction in a dry method disclosed in Patent Document 1 has not been able to sufficiently reduce Fe derived from a magnetic powder contained in a positive electrode material.

It is considered that the degree of reduction of Fe in Patent Document 1 is sufficient from the viewpoint of suppressing micro shorts, which is the object of the invention disclosed in Patent Document 1. However, when the purpose is to improve the thermal stability of a lithium ion secondary battery using a lithium-nickel composite oxide as a positive electrode material, it is not sufficient from the viewpoint of providing a lithium-nickel composite oxide in which the content of Fe and Cr as magnetic metals are reduced, which is the subject of the present invention.

Therefore, the inventor of the present invention has made further studies, and found that the Fe and Cr content can be reduced to below 10 ppb by forming a slurry containing a lithium-nickel composite oxide, then by passing the slurry through a pipe equipped with predetermined magnet units, and further by performing magnetic attraction in wet condition. As above, the inventor of the present invention has completed the present invention.

(Magnetic Attraction Step)

The magnetic attraction step will be described with reference to FIGS. 1 to 3.

Figure 1:
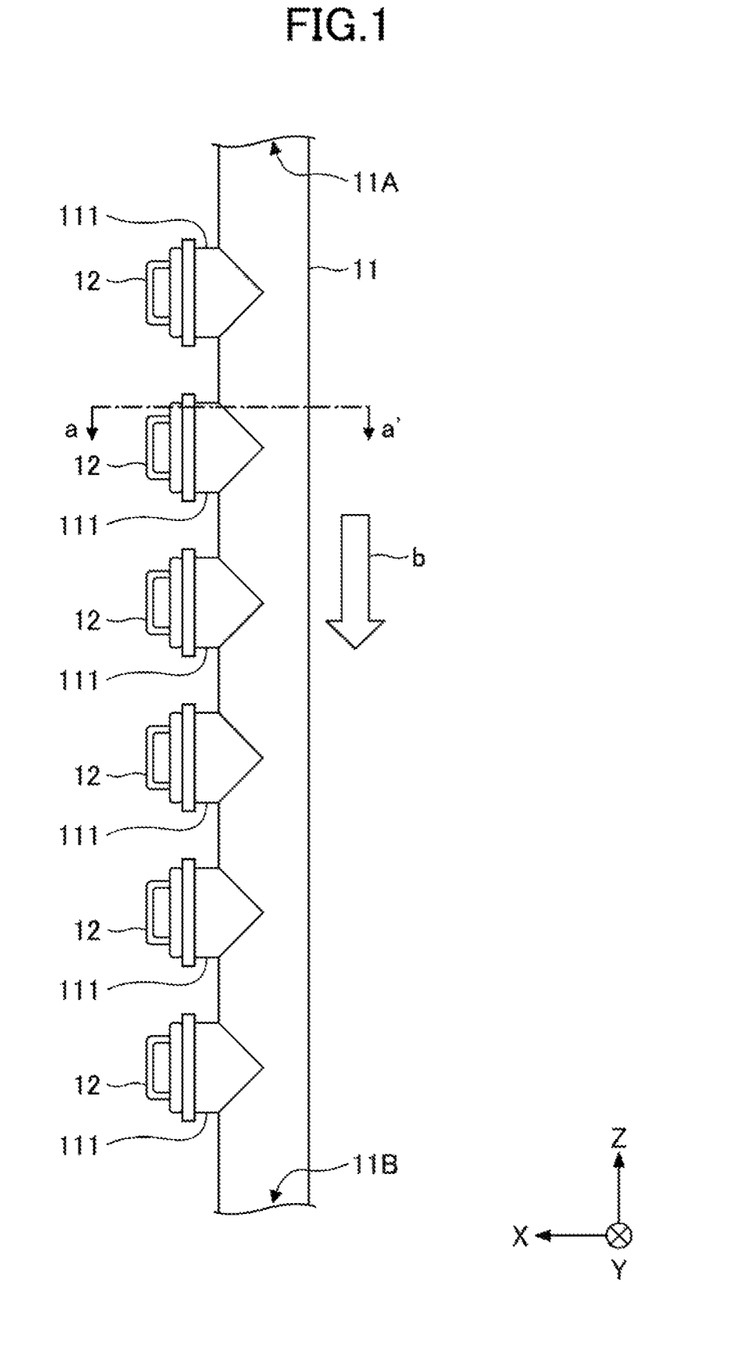
FIG. 1 is an explanatory view of a magnetic attraction equipment.

As shown in FIG. 1, the magnetic attraction step can be performed by supplying a slurry containing a lithium-nickel composite oxide to the pipe 11 in which the magnet units 12 are placed, and passing the slurry through the pipe 11 in which the magnet units 12 are placed. As the lithium-nickel composite oxide, the one represented by the general formula described above can be used, and the element B in the general formula described above is an optional additive component, and thus the element B may be omitted.

The direction of the pipe 11 and the direction of supplying the slurry containing the lithium-nickel composite oxide are not particularly limited. For example, the pipe 11 can be placed vertically and the slurry containing the lithium-nickel composite oxide can be supplied along the block arrow b in FIG. 1.

Note that a first end 11A of the pipe 11 and a second end 11B can be connected to another part which is not illustrated in the figure.

Further, the pipe 11 may be provided with a connecting pipe 111 for providing the magnet units 12.

Although FIG. 1 shows an example in which six magnet units 12 are provided in the pipe 11, the number of magnet units 12 provided in the pipe 11 is not particularly limited. The number of magnet units 12 provided in the pipe 11 can be arbitrarily selected depending on, for example, the number of magnets provided in the magnet units 12, that is, the capacity of magnet attraction, the replacement frequency of the magnet units 12 and the like. However, in order to sufficiently remove Fe and Cr in the lithium-nickel composite oxide, the plurality of magnet units 12 are preferably placed in the pipe 11 along the flow direction of the slurry containing the lithium-nickel composite oxide.

Next, the magnet units 12 will be described.

Figure 2:
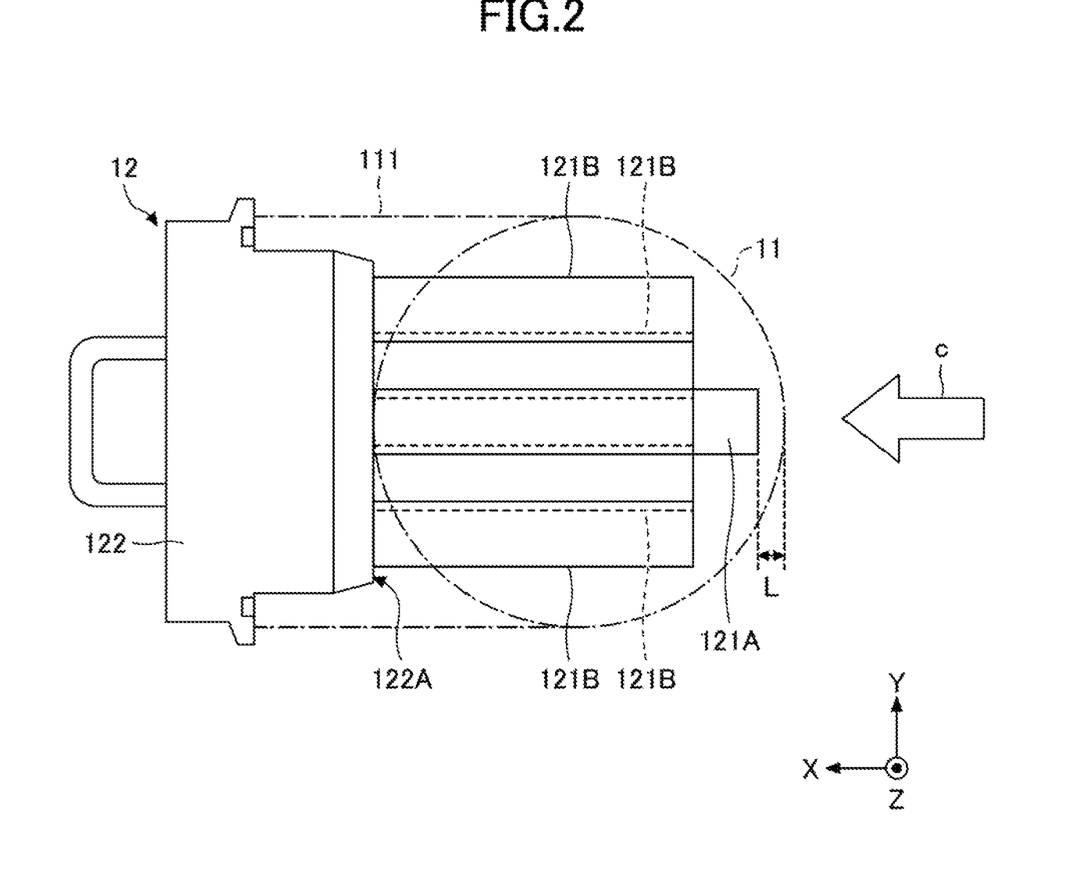
FIG. 2 is a cross-sectional view of the line a-a' in FIG. 1.

FIG. 2 shows a cross-sectional view of the line a-a' in FIG. 1. In FIG. 2, the pipe 11 and the connecting pipe 111 are shown by a long dashed short dashed line so that they can be distinguished from the magnet units 12. FIG. 3 shows a side view of the magnet units 12. The side view of the magnet unit 12 shown in FIG. 3 corresponds to the case where the magnet unit 12 of FIG. 2 is viewed along the block arrow c.

Figure 3:
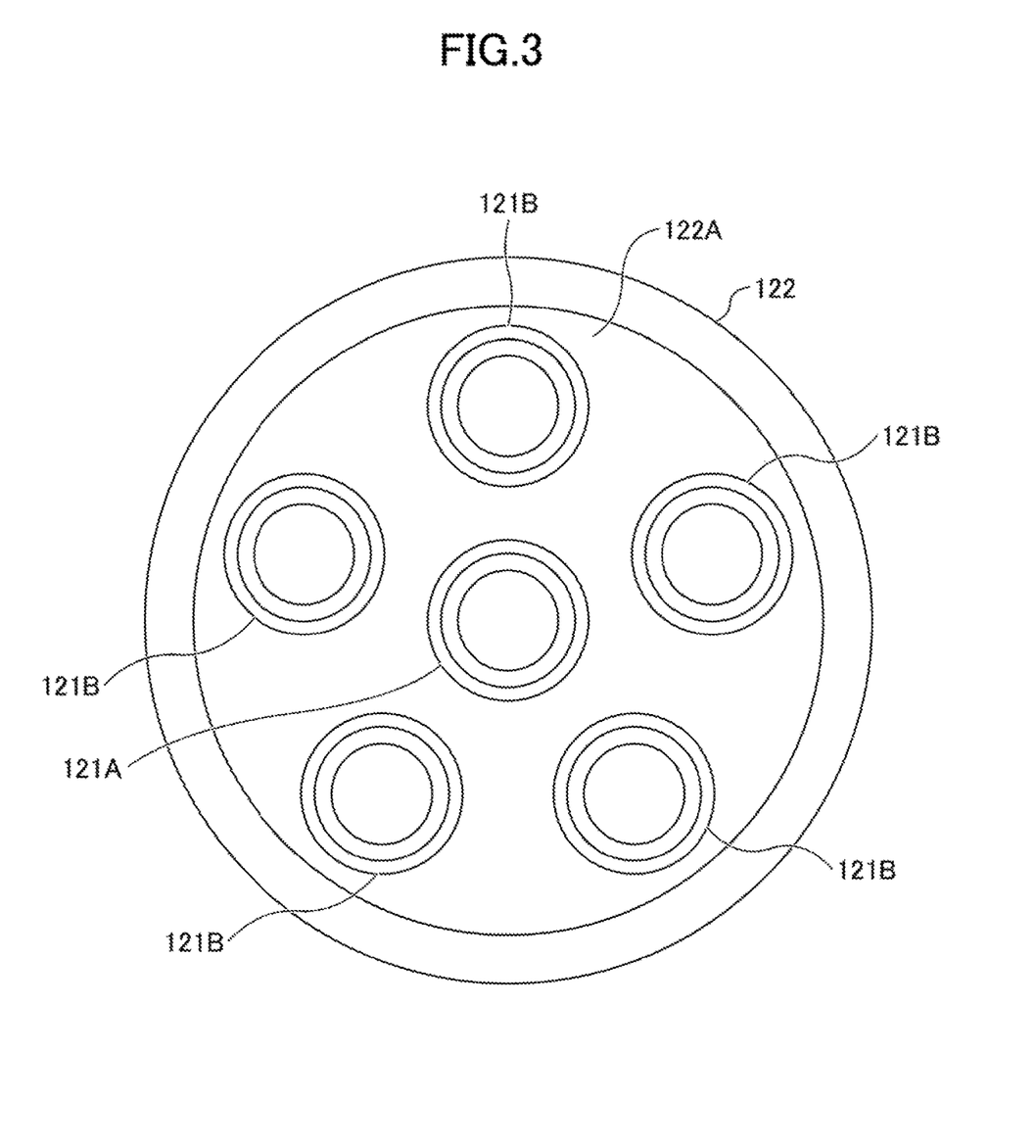
FIG. 3 is a side view of the magnetic unit.

The magnet unit 12 can have a plurality of rod-shaped magnets 121A and 121B as shown in FIGS. 2 and 3.

In the plurality of rod-shaped magnets 121A and 121B, the longitudinal direction thereof, that is, the X-axis direction in FIG. 2 is preferably the flow direction of the slurry containing the lithium-nickel composite oxide, in other words, the plurality of rod-shaped magnets 121A and 121B are preferably placed perpendicular to the Z-axis which is perpendicular to the view shown in FIG. 2, and the rod-shaped magnets 121A and 121B are preferably placed parallel to each other.

For example, the plurality of rod-shaped magnets 121A and 121B can be held and fixed to the magnet holding portion 122 of the magnet unit 12. When the magnet units 12 are placed in the pipe 11, the magnet units 12 are inserted and fixed to the connecting pipe 111 which is provided in the pipe 11. Due to this configuration, the longitudinal directions of the plurality of rod-shaped magnets 121A and 121B are perpendicular to the flow direction of the slurry containing the lithium-nickel composite oxide, and the rod-shaped magnets 121A and 121B are parallel to each other.

The slurry containing the lithium-nickel composite oxide can be brought into contact with the magnets or a magnetic field formed by the magnets by placing the plurality of rod-shaped magnets 121A and 121B as described above with respect to the flow of the slurry containing the lithium-nickel composite oxide. Therefore, the above configuration is preferable because Fe, Cr or the like in the slurry containing the lithium-nickel composite oxide are easily attracted.

For example, when a plurality of rod-shaped magnets is placed in a mesh structure (lattice shape), the openings of the mesh is pressurized by a flow of the slurry. Depending on the size of the openings of the mesh or the flow rate of the slurry containing the lithium-nickel composite oxide, strong pressure may be applied to attracted substances such as Fe or the like attracted by the magnets. Therefore, if the magnetic attraction step is performed over time, the attracted substance may be washed away again by the slurry containing the lithium-nickel composite oxide.

On the other hand, a slit-shaped gap between the adjacent magnets can be formed by placing a plurality of rod-shaped magnets such that the longitudinal directions of the rod-shaped magnets are perpendicular to the flow of the slurry containing the lithium-nickel composite oxide and are parallel to each other. Accordingly, the configuration such that magnetic units are placed in series, for example, a plurality of rod-shaped magnets are placed perpendicular to the flow direction of the slurry containing the lithium-nickel composite oxide and the rod-shaped magnets are parallel to each other, the attracted substance can be prevented from washing away again by the slurry containing the lithium-nickel composite oxide, compared to the case when magnets of the same shape and number are placed in one place in a mesh structure.

In the portion where a plurality of rod-shaped magnets containing in one magnetic unit 12 contact with the slurry, the surface area per unit volume is preferably 0.1 cm$^{-1}$ or more and 0.3 cm$^{-1}$ or less, and more preferably 0.1 cm$^{-1}$ or more and 0.2 cm$^{-1}$ or less.

In the portion where the magnets contact with the slurry, a surface area per unit volume of the plurality of rod-shaped magnets is 0.1 cm$^{-1}$ or more. As a result, the plurality of rod-shaped magnets has a sufficient surface area per unit volume, Fe, Cr or the like in the slurry containing the lithium-nickel composite oxide can be more surely attracted.

However, when the surface area per unit volume of the rod-shaped magnet is larger than 0.3 cm$^{-1}$, the surface area per unit volume of the magnet becomes too large. Therefore, there is a risk that the force for holding the attracted Fe, Cr or the like becomes weak. Hence, for example, when the magnetic attraction step is continuously performed for over time, Fe or the like that has once attracted may be washed away again by the slurry containing the lithium-nickel composite oxide. Thus, as described above, the surface area per unit volume of the rod-shaped magnet is preferably 0.3 $cm^{-1}$ or less.

The magnetic properties of the plurality of rod-shaped magnets are not particularly limited, and can be selected according to, for example, the fluid speed of the slurry containing the lithium-nickel composite oxide or the arrangement of the magnets. The magnetic flux density of the plurality of rod-shaped magnets is preferably 0.9 T (tesla) or more and 1.2 T or less. This is because by adjusting the magnetic flux density of the plurality of rod-shaped magnets to 0.9 T or more, Fe, Cr or the like contained in the slurry containing the lithium-nickel composite oxide can be more reliably attracted. However, if the magnetic flux density of the plurality of rod-shaped magnets is larger than 1.2 T, a substance or the like which is not a target for attraction may also be attracted, therefore, the magnetic flux density is preferably 1.2 T or less.

As the plurality of rod-shaped magnets, either electromagnets or permanent magnets can be used. However, for example, Fe, Cr or the like in the slurry containing the lithium-nickel composite oxide can be surely attracted even in the event of a power failure.

The length in the longitudinal direction of the plurality of rod-shaped magnets is not particularly limited. However, for example, as shown in FIG. 2, a gap between the side wall of the pipe 11 and one end portion of the plurality of rod-shaped magnets 121A, 121B in the longitudinal direction is preferably formed.

In addition, one end of the plurality of rod-shaped magnets may be a free end that is not fixed.

Because the magnet generates a magnetic field, even if a gap is formed between the side wall of the pipe and the plurality of rod-shaped magnets as described above, Fe, Cr or the like in the slurry flowing in the gap where no magnet is present can also be attracted.

On the other hand, if a gap between the side wall of the pipe and the plurality of rod-shaped magnets in the longitudinal direction the plurality of rod-shaped magnets is not formed, a strong pressure would be applied to the attracted substances such as Fe already attracted by the plurality of rod-shaped magnets due to the flow of the slurry depending on the flow rate of the slurry containing lithium-nickel composite oxide. Therefore, if the magnetic attraction step is performed for long time, the attracted substance may be washed away again by the slurry containing the lithium-nickel composite oxide.

In contrast, when a gap between the side wall of the pipe and the plurality of rod-shaped magnets in the longitudinal direction the plurality of rod-shaped magnets is formed, then the pressure caused by the flow of the slurry containing the lithium-nickel composite oxide applied to the attracted material attracted by the plurality of rod-shaped magnets can be reduced. For this reason, the attracted substance once attracted can be prevented from being washed away by the slurry containing the lithium-nickel composite oxide. Therefore, the above-described configuration is preferably applied.

The shortest distance L between the side wall of the pipe 11 and one end of the plurality of the rod-shaped magnets 121A, 121B in the longitudinal direction of the rod-shaped magnets 121A, 121B is not particularly limited, but is preferably, for example, 5 mm or more and 20 mm or less.

The pressure caused by the flow of the slurry containing the lithium-nickel composite oxide applied to the material attracted by the plurality of rod-shaped magnets can be reduced by adjusting the shortest distance L between the side wall of the pipe 11 and one end of the plurality of rod-shaped magnet to 5 mm or more. For this reason, the attracted substance can be prevented from being washed away by the slurry containing the lithium-nickel composite oxide. Therefore, the above-described configuration is preferably applied.

Further, by adjusting the shortest distance L between the side wall of the pipe 11 and one end of the plurality of rod-shaped magnets 121A and 121B to 20 mm or less, the magnetic fields from the plurality of rod-shaped magnets can reach the side wall of the pipe 11 and its vicinity more reliably and Fe, Cr or the like in the slurry containing the lithium-nickel composite oxide can be more surely attracted. Therefore, the above-described configuration is preferably applied.

Further, when the plurality of rod-shaped magnets 121A and 121B in the pipe 11 are viewed from the upstream side in the flow direction of the slurry containing the lithium-nickel composite oxide along the flow direction, the area ratio occupied by the plurality of rod-shaped magnets 121A and 121B in the pipe 11 (hereinafter, also referred to as "the area ratio of the magnet in the pipe") is preferably 50% or more and 80% or less.

As shown in FIG. 2, the area ratio of the magnets in the pipe refers to the ratio occupied by the plurality of rod-shaped magnets 121A and 121B in the pipe 11 when the plurality of rod-shaped magnets 121A and 121B of the magnetic units 12 in the pipe 11 is viewed from the upstream side of the flow direction of the slurry containing the lithium-nickel composite oxide in the pipe 11 rather than that of the magnetic units 12.

By adjusting the area ratio of the magnet in the pipe to 50% or more, the probability that the slurry containing the lithium-nickel composite oxide and the surface of the magnet come into contact with each other is increased, and Fe, Cr or the like in the slurry are more surely attracted.

Then, by controlling the area ratio of the magnet in the pipe to 80% or less, the resistance to the flow of the slurry containing the lithium-nickel composite oxide is suppressed, so that the attracted substances such as Fe, Cr or the like attracted by the magnets can be prevented from being washed away again by the pressure of the slurry.

When the plurality of rod-shaped magnets 121A and 121B are placed in the pipe 11, the plurality of rod-shaped magnets is placed such that their longitudinal direction (length direction) is perpendicular to the flow direction of the slurry containing the lithium-nickel composite oxide, and the rod-shaped magnets are parallel to each other. The arrangement of the plurality of rod-shaped magnets in the magnet unit 12 is not particularly limited. However, as shown in FIG. 3, for example, the magnet 121A is provided in a central portion on the surface 122A which fix the plurality of rod-shaped magnets of the magnet unit 12, and the plurality of rod-shaped magnets 121B may also be placed on a circumference of the magnet 121A.

By placing the plurality of rod-shaped magnets in the magnet units 12 as described above, a flow path of slurry containing the lithium-nickel composite oxide among the plurality of rod-shaped magnets in the pipe 11 is easily formed. As a result, the attraction rate of Fe, Cr or the like can be increased.

The arrangement of the plurality of rod-shaped magnets 121A and 121B in the magnet unit 12 is not particularly limited as described above. However, as shown in FIG. 2, when the magnet unit 12 is viewed from the upstream side along the flow direction of the slurry containing the lithium-nickel composite oxide in the pipe 11 in which the magnet unit 12 is placed, the magnets 121A and 121B are preferably placed so that the magnets 121A and 121B partially overlap with each other in the lateral direction (width direction), that is, the Y-axis direction. In such arrangement, when the slurry containing the lithium-nickel composite oxide flows, the slurry passes between the magnets 121A and 121B, as a result, the attraction rate of Fe, Cr or the like in the slurry can be increased.

The magnets 121A and 121B are not necessary the same length in the longitudinal direction, and can be selected according to the shape of the inner wall of the pipe 11. For example, the magnet 121A passing through the center of the pipe 11 or in the vicinity thereof may be configured such that the length in the longitudinal direction is longer than that of the other magnet 121B.

Further, the magnets 121A and 121B may have a rod shape, but in order to secure a sufficient surface area, they preferably, for example, have a cylindrical shape.

The magnetic attraction step can be performed by passing a slurry containing a lithium-nickel composite oxide through the pipe 11 in which the magnet unit 12 described above is placed.

The method of producing the lithium-nickel composite oxide of the present embodiment may include further steps in addition to the above magnetic attraction step.

(Lithium-Nickel Composite Oxide Preparation Step)

For example, a lithium-nickel composite oxide preparation step in which a lithium-nickel composite oxide to be subjected to a magnetic attraction step is prepared can be carried out.

The lithium-nickel composite oxide preparation step may further include the following steps.

A mixing step of mixing a lithium compound and a nickel composite oxide to prepare a lithium-nickel composite oxide precursor mixture.

A firing step of firing the lithium-nickel composite oxide precursor mixture.

Each step will be described below.

(1) Mixing Step

In the mixing step, the lithium compound and the nickel composite oxide can be mixed to obtain a lithium-nickel composite oxide precursor mixture that is a mixture (mixed powder).

The lithium compound used in the mixing step is not particularly limited, but one or more selected from lithium hydroxide, lithium carbonate and the like can be preferably used.

The nickel composite oxide is not particularly limited, but preferably has a composition corresponding to the lithium-nickel composite oxide produced from the mixture of lithium-nickel composite oxide precursor prepared in the mixing step.

Specific examples of the nickel composite oxide include a nickel composite oxide represented by the general formula:

$Ni_xCo_yA_sB_tO_{1+\beta}$.

Note that x, y, s, t and β in the above formula satisfy $0.03 \leq x \leq 0.93$, $0.03 \leq y \leq 0.50$, $0.04 \leq s \leq 0.6$, $0 \leq t < 0.1$, $0 \leq \beta < 0.3$ and $x+y+s+t=1$. In addition, the element A is one or more selected from Mn and Al, and the element B is one or more selected from Mg, Ca, Ti, V, Zr, Nb, Mo, Sr and W.

The method of producing the nickel composite oxide is not particularly limited, but the nickel composite oxide can be produced, for example, by roasting the nickel composite hydroxide (roasting step).

The nickel composite hydroxide to be roasted in the roasting step is not particularly limited, and preferably has a composition corresponding to the target nickel composite oxide. Examples of the nickel composite hydroxide include a nickel composite hydroxide represented by the general formula:

$Ni_xCo_yA_sB_t(OH)_{2+\gamma}$.

Note that x, y, s, t and y in the above formula satisfy $0.03 \leq x \leq 0.93$, $0.03 \leq y \leq 0.50$, $0.04 \leq s \leq 0.6$, $0 \leq t < 0.1$, $0 \leq \beta < 0.3$ and $x+y+s+t=1$. The element A is one or more selected from Mn and Al, and the element B is one or more selected from Mg, Ca, Ti, V, Zr, Nb, Mo, Sr and W.

The method of producing the nickel composite hydroxide is not particularly limited, and the nickel composite hydroxide can be produced by coprecipitating contained metals such as nickel, cobalt, element A, and element B.

The conditions for roasting the nickel composite hydroxide particles are not particularly limited. For example, the roasting temperature in the roasting step is preferably 450° C. or higher and 750° C. or lower, and more preferably 500° C. or higher and 700° C. or lower.

The atmosphere for roasting the nickel composite hydroxide particles is not particularly limited and may be a non-reducing atmosphere. The roasting the nickel composite hydroxide particles is preferably performed under an oxygen-containing gas atmosphere or in an oxygen-containing gas flow. The oxygen content ratio in the oxygen-containing gas is not particularly limited, but the oxygen content ratio is, for example, preferably 18% by volume or more and more preferably 20% by volume or more. Further, since the oxygen-containing gas can be oxygen, the oxygen content ratio can be 100% by volume or less. Especially, air is preferably used as the oxygen-containing gas.

The equipment used for roasting is not particularly limited as long as it can heat the nickel composite hydroxide in a non-reducing atmosphere. An electric furnace that does not generate gas is preferably used.

The lithium compound and the nickel composite oxide are preferably mixed so that the ratio (Li/Me) of the number of atoms of lithium (Li) and the number of atoms of a metal (Me) other than lithium in the lithium-nickel composite oxide precursor mixture to be obtained becomes 1.00 or more and less than 1.30.

This is because the ratio Li/Me hardly changes before and after the firing step, which will be described later, and thus the ratio Li/Me in the mixture subjected to the firing step becomes almost the same as the ratio Li/Me in the lithium-nickel composite oxide to be obtained. Therefore, it is preferably mixed so that the ratio Li/Me in the lithium-nickel composite oxide precursor mixture to be prepared in the mixing step is preferably the same as the ratio Li/Me in the lithium-nickel composite oxide to be obtained.

In the mixing step, a general mixer can be used as a mixing device for mixing the lithium compound and the nickel composite oxide. For example, mixing devices such as a shaker mixer, a loedige mixer, a julia mixer, a V blender, or the like can be used.

(2) Firing Step

In the firing step, the lithium-nickel composite oxide precursor mixture obtained in the above mixing step can be fired to obtain a lithium-nickel composite oxide. When the mixture is fired in the firing step, lithium in the lithium compound diffuses into the nickel composite oxide to form a lithium-nickel composite oxide.

In the firing step, the firing temperature for firing the lithium-nickel composite oxide precursor mixture is not particularly limited, but is preferably 600° C. or higher and 950° C. or lower, and more preferably 700° C. or higher and 900° C. or lower.

The diffusion of lithium into the nickel composite oxide can be sufficiently promoted, and the crystal structure of the lithium-nickel composite oxide to be obtained can be made particularly uniform by adjusting the firing temperature to 600° C. or higher. Accordingly, it is preferable because the battery characteristics can be particularly improved when the product is used as the positive electrode active material. Moreover, because the reaction can be sufficiently advanced, it is possible to particularly suppress the residual lithium and the residual unreacted particles.

The progress of sintering between the particles of the generated lithium-nickel composite oxide can be suppressed by adjusting the firing temperature to 950° C. or lower. Further, it is possible to suppress the generation of abnormal grain growth and prevent the particles of the lithium-nickel composite oxide to be obtained from becoming coarse.

In addition, in the process of raising the temperature to the heat treatment temperature, it is preferable to maintain the temperature near the melting point of the lithium compound for 1 hour or more and 5 hours or less so that the reaction can be carried out more uniformly.

Of the firing time in the firing step, the holding time at a predetermined temperature, that is, the above-mentioned firing temperature, is not particularly limited. However, the holding time is preferably 2 hours or more and more preferably 3 hours or more. This is because by adjusting the holding time at the firing temperature to 2 hours or more, it is possible to sufficiently promote the generation of the lithium-nickel composite oxide and more reliably minimize the amount of unreacted material.

The upper limit of the holding time at the firing temperature is not particularly limited, but the upper limit of the holding time is preferably 24 hours or less in consideration of productivity and the like.

The atmosphere during firing is not particularly limited, but an oxidizing atmosphere is preferable. An oxygen-containing gas atmosphere can be preferably used as the oxidizing atmosphere. For example, an atmosphere having an oxygen concentration of 18% by volume or more and more preferably 100% by volume or less.

This is because the crystallinity of the lithium-nickel composite oxide can be particularly enhanced by adjusting the oxygen concentration in the atmosphere during firing to 18% by volume or more.

When the oxygen-containing gas atmosphere is used, as the gas forming the atmosphere, for example, air (atmosphere), oxygen, a mixed gas of oxygen and an inert gas or the like can be used.

When a mixed gas of oxygen and an inert gas as described above is used as the gas forming the oxygen-containing gas atmosphere, the oxygen concentration in the mixed gas preferably satisfies the above range.

In particular, the firing step is preferably carried out in an oxygen-containing gas flow, more preferably in an air or oxygen flow. Particularly in consideration of battery characteristics, the firing step is preferably carried out in an oxygen flow.

The furnace used for firing is not particularly limited. For example, any furnace capable of firing the mixture in air or an oxygen flow may be used. From the viewpoint of maintaining a uniform atmosphere in the furnace, an electric furnace that does not generate gas is preferably used, and either a batch type or continuous type furnace can be used.

The positive electrode active material obtained by the firing step may have undergone aggregation or slight sintering. In this case, the obtained positive electrode active material may be crushed after the firing step.

Here, crushing refers a manipulation to loosen aggregates by applying mechanical energy to the aggregate composed of a plurality of secondary particles generated by formation of neck due to a sintering between secondary particles during firing. As a result, the secondary particles are separated almost without breaking the secondary particles themselves.

The obtained lithium-nickel composite oxide can be classified, as needed.

Further, pre-firing before the firing step can be carried out.

When pre-firing is carried out, the pre-firing temperature is not particularly limited. The pre-firing temperature may be lower than the firing temperature in the firing step. The pre-firing temperature is preferably 250° C. or higher and 600° C. or lower, and more preferably 350° C. or higher and 550° C. or lower.

The pre-firing time, that is, the holding time at the pre-firing temperature is preferably, for example, about 1 hour or more and 10 hours or less, more preferably 3 hours or more and 6 hours or less.

After the pre-firing, the material may be once cooled and then subjected to the firing step, or the firing step can be consecutively carried out by raising the temperature from the pre-firing temperature to the firing temperature.

The atmosphere for carrying out the pre-firing is not particularly limited, but may be the same atmosphere, for example, as in the firing step.

Diffusion of lithium into the nickel composite oxide is sufficiently carried out by performing the pre-firing, and a particularly uniform lithium-nickel composite oxide can be obtained.

(Slurry Forming Step)

Further, the method of producing a lithium-nickel composite oxide of the present embodiment can also have a slurry forming step of adding water to the lithium-nickel composite oxide obtained in the firing step to form a slurry.

In the slurry forming step, water is added to the lithium-nickel composite-oxide. Therefore, for example, excess components attached to the lithium-nickel composite oxide can be removed water by dehydration treatment after performing a magnetic attraction step. Therefore, the lithium-nickel composite oxide can also be washed with water by performing the magnetic attraction step and the dehydration step from the slurry forming step.

In the slurry forming step, the lithium-nickel composite oxide obtained in the firing step can be mixed with water to form a slurry. The mixing ratio of water and the lithium-nickel composite oxide at the time of forming slurry is not particularly limited. The mixing ratio is arbitrarily selected depending on the viscosity of the slurry to be obtained and the degree of removing excess components attached to the lithium-nickel composite oxide.

The water used in the slurry forming step is not particularly limited, but water having an electric conductivity of less than 200 μS/cm is preferably used. Further, the temperature of water so that the temperature of the slurry is 10° C. or higher and 40° C. or lower is preferably selected.

The slurry containing the lithium-nickel composite oxide prepared in the slurry forming step can be subjected to the above-mentioned magnetic attraction step.

After the magnetic attraction step, a dehydration step of filtering the slurry to separate from water, and a drying step of drying the collected water-washed lithium-nickel composite oxide can be carried out.

In the dehydration step, the method of separating the slurry and the water is not particularly limited, but, for example, a filter press, a decanter type centrifuge or the like can be used.

The drying conditions in the drying step are not particularly limited, but are preferably 80° C. or higher and 700° C. or lower, more preferably 100° C. or higher and 550° C. or lower, and further preferably 120° C. or higher and 350° C. or lower.

The atmosphere of the drying step is not particularly limited, but the drying step is more preferably carried out, for example, in a vacuum atmosphere.

The lithium-nickel composite oxide described above can be produced by the method of producing a lithium-nickel composite oxide of the present embodiment. Therefore, when the lithium-nickel composite oxide is used as a positive electrode material of lithium ion secondary battery, the thermal stability of the lithium ion secondary battery can be enhanced.

[Non-Aqueous Electrolyte Secondary Battery]

Next, a configuration example of the non-aqueous electrolyte secondary battery of the present embodiment will be described.

The non-aqueous electrolyte secondary battery of the present embodiment can have a positive electrode using the above-mentioned lithium-nickel composite oxide as a positive electrode material.

First, a structural example of the structure of the non-aqueous electrolyte secondary battery of the present embodiment will be described.

The non-aqueous electrolyte secondary battery of the present embodiment may have substantially the same structure as a general non-aqueous electrolyte secondary battery, except that the lithium-nickel composite oxide described above is used for the positive electrode material.

Specifically, the non-aqueous electrolyte secondary battery of the present embodiment may have a structure including a case, a positive electrode, a negative electrode, an electrolytic solution and a separator housed in the case.

More specifically, the positive electrode and the negative electrode can be laminated via a separator to form an electrode body, and the obtained electrode body can be impregnated with the electrolytic solution. Then, between the positive electrode current collector of the positive electrode and the positive electrode terminal that connects to the outside, and between the negative electrode current collector of the negative electrode and the negative electrode terminal that communicates with the outside, are respectively connected using current collecting leads or the like. As a result, the structure tightly closed in the case can be configured.

Needless to say, the structure of the non-aqueous electrolyte secondary battery of the present embodiment is not limited to the above example, and various external shapes such as a cylindrical shape and a laminated shape can be adopted.

A configuration example of each part will be described below.

(Positive Electrode)

First, the positive electrode will be explained.

The positive electrode is a sheet-shaped part, and can be formed, for example, by applying the positive electrode mixture paste containing the above-mentioned lithium-nickel composite oxide onto the surface of a current collector made of aluminum foil and by drying the surface. The positive electrode is appropriately treated according to the battery used. For example, a cutting process for forming an appropriate size according to the target battery and a pressure compression process by a roll press or the like for increasing the electrode density can be carried out.

The above-described positive electrode mixture paste can be formed by adding a solvent to the positive electrode mixture and kneading the mixture. The positive electrode mixture can be formed by mixing the powdery lithium-nickel composite oxide described above, a conductive material, and a binder.

The conductive material is added to give appropriate conductivity to the electrode. The material of the conductive material is not particularly limited. Examples of the conductive material include graphite such as natural graphite, artificial graphite and expanded graphite, and carbon black-based materials such as acetylene black and Ketjenblack (registered trademark).

The binder plays a role in binding the lithium-nickel composite oxide, which is the positive electrode active material. The binder used for the positive electrode mixture is not particularly limited. Examples of binder include one or more selected from polyvinylidene fluoride (PVDF), polytetrafluoroethylene (PTFE), fluororubber, ethylene propylene diene rubber, styrene butadiene, cellulosic resin, polyacrylic acid and the like.

In addition, activated carbon or the like can be added to the positive electrode mixture. The electric double layer capacity of the positive electrode can be increased by adding activated carbon or the like to the positive electrode mixture.

The solvent has a function of dissolving the binder to disperse the lithium-nickel composite oxide, the conductive material, activated carbon and the like in the binder. The solvent is not particularly limited, but an organic solvent such as N-methyl-2-pyrrolidone or the like can be used.

Further, the mixing ratio of each material in the positive electrode mixture paste is not particularly limited, and may be the same as in the case of the positive electrode of a general non-aqueous electrolyte secondary battery. For example, when the solid content of the positive electrode mixture excluding the solvent is 100 parts by mass, the content of the lithium-nickel composite oxide is 60 parts by mass or more and 95 parts by mass or less, and the content of the conductive material is adjusted to 1 part by mass or more and 20 parts by mass or more. Also, the content of the binder may be adjusted to 1 part by mass or more and 20 parts by mass or less.

The method of producing the positive electrode is not limited to the above method, and the positive electrode mixture or the positive electrode mixture paste may be press-molded and then dried in a vacuum atmosphere.

(Negative Electrode)

The negative electrode is a sheet-shaped part, and can be formed, for example, by applying a negative electrode mixture paste onto the surface of a metal foil current collector such as copper and by drying the surface.

The negative electrode is formed by a method substantially similar to that of the above-described positive electrode, though various components constituting the negative electrode mixture paste, the composition thereof, the material of the current collector and the like are different. Further, various treatments may be performed as necessary in the same manner as the positive electrode.

The negative electrode mixture paste can be made into a paste by adding an appropriate solvent to the negative electrode mixture obtained by mixing the negative electrode active material and the binder.

As the negative electrode active material, for example, a material containing lithium such as metallic lithium or a lithium alloy, or a storage material capable of storing and de-intercalating lithium ions can be adopted.

The storage material is not particularly limited. Examples of occluding substance include one or more selected from natural graphite, artificial graphite, a fired body of an organic compound such as phenol resin, and a powder of a carbon substance such as coke.

When such storage material is used as the negative electrode active material, a fluorine-containing resin such as PVDF can be used as the binder in the same manner as the positive electrode. As the solvent for dispersing the negative electrode active material in the binder, an organic solvent such as N-methyl-2-pyrrolidone can be used.

(Separator)

The separator is placed so as to be sandwiched between the positive electrode and the negative electrode, and has a function of separating the positive electrode and the negative electrode and holding the electrolytic solution.

As a material of the separator, a thin film such as polyethylene or polypropylene having a large number of fine holes can be used. A material of the separator is not particularly limited as long as the material of the separator has the above-mentioned function.

(Electrolyte Solution)

The electrolyte solution is a lithium salt as a supporting salt dissolved in an organic solvent.

Examples of the organic solvent include cyclic carbonates such as ethylene carbonate, propylene carbonate, butylene carbonate and trifluoropropylene carbonate; chain carbonates such as diethyl carbonate, dimethyl carbonate, ethylmethyl carbonate and dipropyl carbonate; ether compounds such as ethylmethylsulfone and butanesultone; phosphorus compounds such as triethyl phosphate, and trioctyl phosphate or the like. These may be used alone or in combination of two or more.

As the supporting salt, $LiPF_6$, $LiBF_4$, $LiClO_4$, $LiAsF_6$, $LiN(CF_3SO_2)_2$, and complex salts thereof can be used.

The electrolytic solution may contain a radical scavenger, a surfactant, a flame retardant or the like in order to improve the battery characteristics.

Up to this point, the case where a non-aqueous electrolyte solution is used as the non-aqueous electrolyte has been described as an example, but the embodiment is not limited thereto. A solid electrolyte may be used as the non-aqueous electrolyte. The solid electrolyte has the property of withstanding a high voltage. Examples of the solid electrolyte include inorganic solid electrolytes and organic solid electrolytes.

Examples of the inorganic solid electrolyte include oxide-based solid electrolytes and sulfide-based solid electrolytes.

The oxide-based solid electrolyte is not particularly limited. For example, the oxide-based solid electrolyte containing oxygen (O) and having lithium ion conductivity and electronic insulation can be suitably used. Examples of oxide-based solid electrolyte include one or more kinds selected from lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$–$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ (0≤X≤1), $Li_{1+x}Al_xGe_{2-x}(PO_4)_3$ (0≤X≤1), $LiTi_2(PO_4)_3$, $Li_{3x}La_{2/3-x}TiO_3$ (0≤X≤2/3), $Li_5La_3Ta_2O_{12}$, $Li_7La_3Zr_2O_{12}$, $Li_6BaLa_2Ta_2O_{12}$, $L_{3.6}Si_{0.6}P_{0.4}O_4$ and the like.

The sulfide-based solid electrolyte is not particularly limited. The sulfide-based solid electrolyte containing, for example, sulfur (S) and having lithium ion conductivity and electronic insulation can be suitably used. Examples of the sulfide-based solid electrolyte include one or more kinds selected from $Li_2S$—$P_2S_5$, $Li_2S$—$SiS_2$, $LiI$—$LiS$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$ and the like.

As the inorganic solid electrolyte, those other than the above may be used, and for example, $Li_3N$, $LiI$, $Li_3N$—$LiI$—$LiOH$ and the like may be used.

The organic solid electrolyte is not particularly limited as long as it is a polymer compound exhibiting ion conductivity. For example, polyethylene oxide, polypropylene oxide, copolymers thereof or the like can be used. Further, the organic solid electrolyte may contain a supporting salt (lithium salt).

As described above, the secondary battery of the present embodiment is not limited to the form using the non-aqueous electrolyte solution as the non-aqueous electrolyte. For example, a secondary battery using a non-aqueous electrolyte of solid-state, that is, a secondary battery can be an all-solid-state battery. In the case of an all-solid-state battery, the configuration other than the positive electrode active material can be changed as necessary.

The non-aqueous electrolyte secondary battery of the present embodiment includes a positive electrode using the above-mentioned lithium-nickel composite oxide as a positive electrode material. Therefore, the non-aqueous electrolyte secondary battery of the present embodiment exhibits battery characteristics with excellent thermal stability.

EXAMPLES

Hereinafter, the present invention will be described more specifically with reference to Examples. However, the present invention is not limited to the following examples.

Example 1

By the following procedure, a lithium-nickel composite oxide in which the content of magnetic metals, that is, Fe and Cr in the metallic state were reduced was produced.

(Preparation of Lithium-Nickel Composite Oxide)

Each raw material of the lithium-nickel composite oxide was prepared by the following procedure so that the molar ratio of each metal component was Li:Ni:Co:Al=1.01:0.90:0.10:0.04.

(1) Mixing Step

First, a nickel composite oxide to be subjected to the mixing step was prepared according to the following procedure.

Nickel sulphate hexahydrate and cobalt sulphate heptahydrate were dissolved in pure water to form an aqueous solution, and the aqueous solution was dropped into the reaction vessel simultaneously with aqueous ammonia, the caustic soda aqueous solution and the sodium aluminate aqueous solution. Then, spherical nickel composite hydroxide particles, in which primary particles were aggregated, were produced by the reaction crystallization method.

It was confirmed that the molar ratio of Ni, Co and Al contained in the obtained nickel composite hydroxide particles was Ni:Co:Al=1.01:0.90:0.10:0.04. That is, it was confirmed that the nickel composite hydroxide represented by the general formula: $Ni_{0.86}Co_{0.10}Al_{0.04}$ was obtained.

The obtained nickel composite hydroxide was roasted at 700° C. for 2 hours in an air flow of an oxygen-containing gas using an electric furnace to obtain nickel oxide (roasting step). Air (ratio of oxygen content:20% by volume) was used as the oxygen-containing gas. The obtained nickel composite oxide is represented by the general formula: $Ni_{0.86}Co_{0.10}Al_{0.04}O$.

Lithium hydroxide monohydrate was added to the obtained nickel composite oxide and mixed by a V blender so that the ratio Li/Me which is the ratio of the number of Li atoms in the obtained lithium-nickel composite oxide precursor mixture to the number of atoms of the metal (Me) other than Li was adjusted to 1.01.

(2) Firing Step

The obtained lithium-nickel composite oxide precursor mixture was fired at 750° C. for 8 hours in an oxygen-containing gas atmosphere having an oxygen concentration of 80% by volume or more using an electric furnace. The rest of the oxygen-containing gas atmosphere used was an inert gas, specifically nitrogen.

Then, the mixture was cooled to room temperature and crushed to obtain a spherical lithium-nickel composite oxide in which primary particles were aggregated.

(Slurry Forming Step)

Pure water having an electric conductivity of 2 μS/cm was added to the obtained lithium-nickel composite oxide to prepare a slurry having a lithium-nickel composite oxide concentration of 1250 g/L and 30° C.

(Magnetic Attraction Step)

Next, the slurry containing the lithium-nickel composite oxide was passed through a magnetic attraction equipment having the structure shown in FIGS. 1 to 3 at a flow rate of 3 m/min to perform a magnetic attraction.

As shown in FIG. 1, the magnetic attraction equipment was equipped with the pipe 11 which was arranged in the vertical direction for supplying a slurry containing lithium-nickel composite oxide and the connecting pipe 111 for placing the magnetic unit 12 provided in the pipe 11. Then, six magnetic units 12 were placed along the flow direction of the slurry containing lithium-nickel composite oxide.

In addition, the slurry containing lithium-nickel composite oxide was supplied to the pipe 11 along the block arrow b.

Each magnetic unit 12 had a total of six cylindrical rod-shaped magnets 121A and 121B which were permanent magnets having a magnetic flux density of 1.0 T. These rod-shaped magnets 121A and 121B were fixed to the magnet holding portion 122. As shown in FIG. 3, the magnet 121A having a longer length in the longitudinal direction than the other magnets 121B was placed at the center on a surface 122A for fixing a plurality of rod-shaped magnets of the magnetic unit 12. Then, a plurality of rod-shaped magnets 121B was placed on the circumference around the magnet 121A.

Then, when the magnetic unit 12 was placed in the connecting pipe 111, the rod-shaped magnets 121A and 121B were placed so that the longitudinal directions of the rod-shaped magnets 121A and 121B were perpendicular to the flow direction of the slurry containing lithium-nickel composite oxide, and the rod-shaped magnets 121A and 121B were parallel to each other.

When the magnetic unit 12 was placed in the connecting pipe 111, a gap between one end of the rod-shaped magnets 121A and 121B in the longitudinal direction in which the end was not fixed to the magnet holding portion 122 and the side wall of the pipe 11 was provided. Then, the shortest distance L (See FIG. 2) between the one end of the plurality of the rod-shaped magnets 121A and 121B in the longitudinal direction and the side wall of the pipe 11 was adjusted to 5 mm. The plurality of rod-shaped magnets 121A and 121B included in one magnetic unit 12 had a surface area per unit volume of 0.1 cm$^{-1}$ in a portion in contact with the slurry containing lithium-nickel composite oxide. When the plurality of rod-shaped magnets 121A and 121B in the pipe 11 were viewed from the upstream side of the flow direction of the slurry containing lithium-nickel composite oxide along the flow direction, that is, when viewed from the cross-section of the line a-a' in FIG. 1, the plurality of rod-shaped magnets was placed so that the area ratio occupied by the plurality of rod-shaped magnets was 50%.

After the magnetic attraction step was completed, the slurry was filtered with a filter press to remove water (dehydration step). Furthermore, the filtered slurry was dried at 150° C. for 6 hours in a vacuum atmosphere (drying step).

The elements contained in the obtained lithium-nickel composite oxide was analyzed by an ICP emission spectrophotometer (manufactured by Shimadzu Corporation, model: ICPE-9000), and the obtained lithium-nickel composite oxide was confirmed to represent by a general formula: $Li_{1.0}Ni_{0.86}Co_{0.10}Al_{0.04}O_2$. It was confirmed that lithium-nickel composite oxides having the same composition were obtained in the other examples and comparative examples below. Further, because the lithium-nickel composite oxide having the same composition as the charged composition was obtained, it can be said that the lithium-nickel composite oxide in the slurry subjected to the magnetic attraction step also has the same composition.

With respect to the obtained lithium-nickel composite oxide, the content of Fe and Cr as magnetic metal were analyzed by the following procedure.

(Collection of Magnetic Metal)

A slurry was prepared by mixing 500 g of the obtained lithium-nickel composite oxide with 1000 mL of pure water. Then, a magnet of 1.0 T was placed in the slurry and mixed for 10 minutes. After mixing, the material attracted to the surface of the magnet was collected and used as an analytical sample.

(Analysis of Magnetic Metal)

A solution heated and dissolved by adding nitric acid and hydrochloric acid added to the sample for analysis collected by collecting the magnetic metal was analyzed by ICP emission spectrometry.

The results are shown in Table 1.

Example 2

Regarding the portions of the plurality of rod-shaped magnets 121A and 121B included in one magnetic unit 12 that come into contact with the slurry containing lithium-nickel composite oxide slurry, a lithium-nickel composite oxide was obtained and evaluated in the same manner as in Example 1 except that the surface area per unit volume was 0.12 cm$^{-1}$. The result is shown in Table 1.

Example 3

When the plurality of rod-shaped magnets 121A and 121B in the pipe 11 were viewed from the upstream side in the flow direction of the lithium-nickel composite oxide slurry along the flow direction, a lithium-nickel composite oxide was obtained and evaluated in the same manner as in Example 1 except that the structure having the area ratio occupied by the plurality of rod-shaped magnets in the pipe was 80%. The result is shown in Table 1.

Example 4

In the slurry forming step, a lithium-nickel composite oxide was obtained and evaluated in the same manner as in Example 1 except that the concentration of the lithium-nickel composite oxide in the slurry containing lithium-nickel composite oxide was 750 g/L. The result is shown in Table 1.

Comparative Example 1

A lithium-nickel composite oxide was obtained and evaluated in the same manner as in Example 1 except that the surface area of the rod-shaped magnet per unit volume was 0.05 cm$^{-1}$ in the portion where the slurry containing lithium-nickel composite oxide was passed through in the magnetic attraction equipment. The result is shown in Table 1.

Comparative Example 2

In the step of magnetic attraction, the lithium-nickel composite oxide, a lithium-nickel composite oxide was obtained and evaluated in the same manner as in Example 1 except that powdered lithium-nickel composite oxide was passed through the magnetic attraction equipment provided vertically at a speed of 87 kg/min. The result is shown in Table 1.

TABLE 1

|  | Fe content (ppb) | Cr content (ppb) |
|---|---|---|
| Example 1 | 7 | 8 |
| Example 2 | <5 | <5 |
| Example 3 | <5 | <5 |
| Example 4 | <5 | <5 |
| Comparative Example 1 | 13 | 15 |
| Comparative Example 2 | 30 | 33 |

From the results shown in Table 1, it was confirmed that the lithium-nickel composite oxide with reduced content of Fe and Cr as magnetic metal was obtained by forming lithium-nickel composite oxide in slurry state and performing magnetic attraction step in which magnets were placed in the predetermined arrangement.

Then, the lithium-nickel composite oxide in which the content of Fr and Cr as magnetic metals are reduced, particularly, a non-aqueous electrolyte secondary battery in which a lithium-nickel composite oxide having a Fe content of less than 10 ppb and a Cr content of less than 10 ppb is used as a positive electrode material can enhance the thermal stability.

Although the lithium-nickel composite oxide and the method of producing the lithium-nickel composite oxide have been described above in the embodiments and examples, the present invention is not limited to the above embodiments and examples. Various modifications and changes can be adapted within the scope of the gist of the present invention described in the claims.

The present Applications is based on and claims priority to Patent Application No. 2018-063187, filed on Mar. 28, 2018 with the Japan Patent Office, the entire contents of which are hereby incorporated by reference.

DESCRIPTION OF THE REFERENCE NUMERALS

11 Pipe
12 Magnetic units
121A, 121B Magnets

The invention claimed is:

1. A method of producing a lithium-nickel composite oxide comprising:
    passing a slurry containing a lithium-nickel composite oxide represented by a general formula:

$Li_{1+u}Ni_xCo_yA_sB_tO_{2+\alpha}$, through a pipe with one or more magnet units having a plurality of rod-shaped magnets, thereby causing Fe and Cr to be adsorbed on the plurality of rod-shaped magnets,
        wherein u, x, y, s, t and α in the above formula satisfy 0≤u<0.3, 0.03≤x≤0.93, 0.03≤y≤0.50, 0.04≤s≤0.6, 0≤t<0.1, 0≤α<0.3 and x+y+s+t=1,
        wherein an element A is one or more selected from Mn and Al, and an element B is one or more selected from Mg, Ca, Ti, V, Zr, Nb, Mo, Sr and W, and
        wherein the plurality of rod-shaped magnets is placed such that longitudinal directions thereof are perpendicular to a flow direction of the slurry containing a lithium-nickel composite oxide, and are parallel to each other, and
    wherein the plurality of rod-shaped magnets has a surface area per unit volume of 0.1 cm$^{-1}$ or more and 0.3 cm$^{-1}$ or less in a portion that contacts the slurry containing a lithium-nickel composite oxide, and
        wherein a gap is provided between one end of the plurality of rod-shaped magnets in the longitudinal direction and a side wall of the pipe.

2. The method of producing a lithium-nickel composite oxide according to claim 1,
    wherein a plurality of the magnet units is placed in the pipe along the flow direction of the slurry containing a lithium-nickel composite oxide.

3. The method of producing a lithium-nickel composite oxide according to claim 1,
    wherein when the plurality of rod-shaped magnets in the pipe are viewed from an upstream side in the flow direction of the slurry containing a lithium-nickel composite oxide along the flow direction, an area ratio occupied by the plurality of rod-shaped magnets in the pipe is 50% or more and 80% or less.

* * * * *